United States Patent Office 3,666,632
Patented May 30, 1972

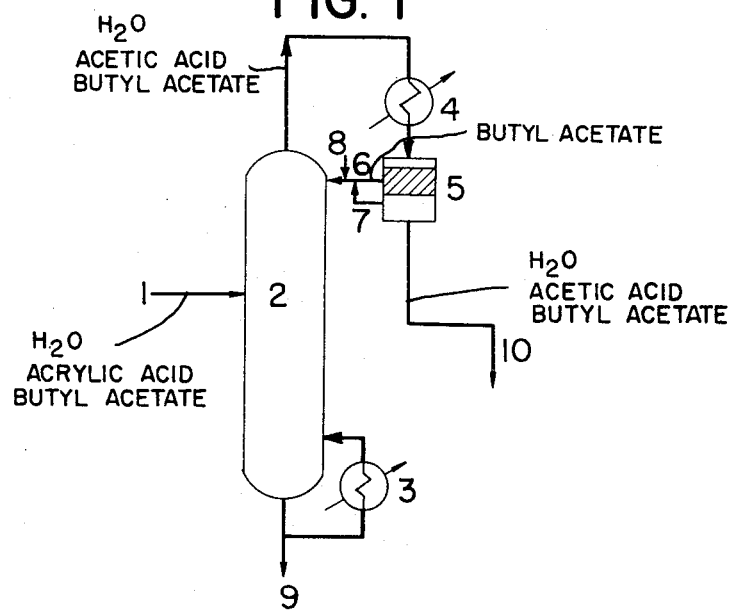
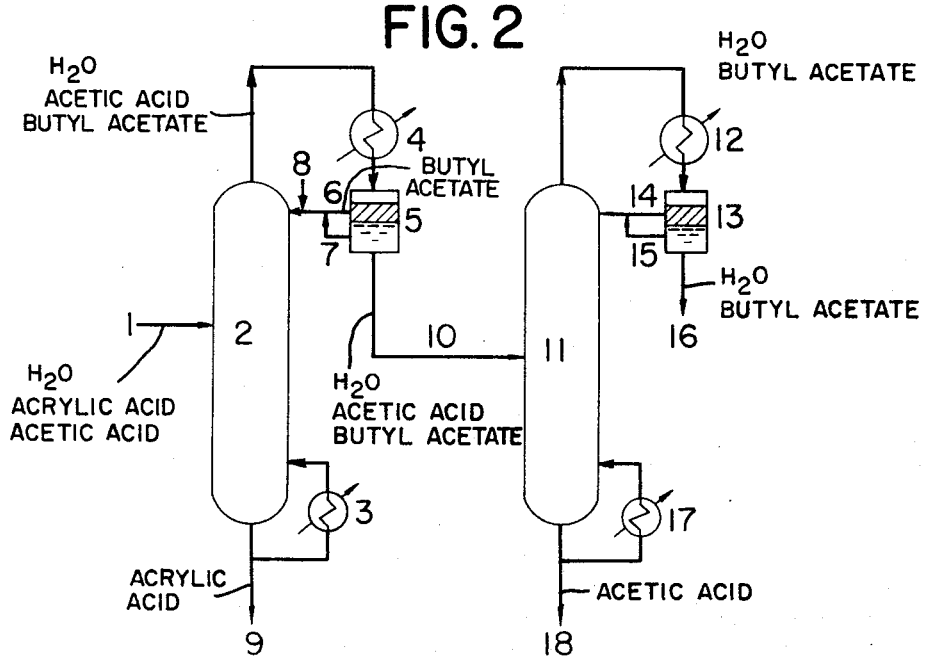

3,666,632
METHOD FOR THE SEPARATION OF ACRYLIC ACID FROM AQUEOUS SOLUTION CONTAINING ACRYLIC ACID AND ACETIC ACID
Makoto Honda, Tokyo, Yasuhiro Kubota, Yokohama-shi, Atsushi Aoshima and Tokuichi Hisamatsu, Kawasaki-shi, and Minoru Ueda, Yokohama-shi, Japan, assignors to Asahi Kasei Kogyo Kabushiki Kaisha, Osaka, Japan
Filed Oct. 2, 1969, Ser. No. 863,248
Claims priority, application Japan, Oct. 8, 1968, 43/72,825; Nov. 9, 1968, 43/81,729; Nov. 14, 1968, 43/82,876
Int. Cl. B01d 3/36; C07c 57/04
U.S. Cl. 203—56      8 Claims

ABSTRACT OF THE DISCLOSURE

In the process for separating acrylic acid from aqueous solution containing acrylic acid and acetic acid, the improvement which comprises subjecting the said aqueous solution to an azeotropic distillation in the presence of at least one member selected from the group consisting of butyl acetate, ethyl butyrate, ethyl isobutyrate, ethyl methacrylate, propyl acrylate and propyl propionate as an entrainer, distilling off acetic acid and water from the column head and separating acrylic acid from the column bottom.

BACKGROUND OF THE INVENTION

(1) Field of the invention

The present invention relates to a method for the separation of acrylic acid from aqueous solution containing acrylic acid and acetic acid, and specifically, to the method for separating acrylic acid from a reaction product obtained in the process for producing acrylic acid by oxidation of propylene or acrolein.

More particularly, the present invention is concerned with the method for producing pure acrylic acid from aqueous solution containing acrylic acid and acetic acid in one step of distillation of an aqueous solution of acrylic acid and acetic acid obtained by the condensation of a vapor produced by the oxidation of propylene or acrolein to separate acetic acid therefrom.

(2) Description of the prior art

A gaseous mixture of acrylic acid, acetic acid, acrolein, carbon dioxide, carbon monoxide, unreacted propylene and the like can be obtained by oxidizing propylene or acrolein together with steam in the presence of an oxidizing catalyst. By cooling the gaseous mixture and/or dissolving the same in water, an aqueous solution containing acrylic acid and a small quantity of acetic acid and acrolein can be obtained. Generally, said aqueous solution contains 10 to 60% by weight of acrylic acid and acetic acid in amount of from ¼ to ⅟₅₀ by weight of the amount of said acrylic acid.

In the past, a number of catalysts for oxidizing propylene or acrolein have been proposed, but there has not yet been known the catalyst which does not by-produce acetic acid at the time of producing acrylic acid.

In the process for obtaining acrylic acid from an aqueous solution containing acrylic acid and acetic acid by a simple distillation known heretofore, the separation of the respective components from each other is very difficult due to the fact that the relative volatility of the respective components is nearly 1, and hence there are required a column having a number of plates and operations to increase the reflux ratio.

If these prior processes are practised on an industrial scale, a great amount of acrylic acid will be lost from the column head due to the insufficient separation of acrylic acid from acetic acid. In that case, since it is still necessary to provide a number of plates, the bottom temperature of said column is elevated by the pressure drop, and there is formed a low or high polymer of acrylic acid. As a result, a great amount of valuable acrylic acid is lost.

Thus, it is very difficult to obtain a pure acrylic acid economically on an industrial scale from an aqueous solution of acrylic acid and acetic acid by means of a simple rectification, as have been well known in the art.

There has been proposed a method for obtaining acrylic acid comprising liquid-liquid extracting an aqueous solution containing acrylic acid and acetic acid with organc solvents such as ether, dichloroethylene, ethyl acetate, ethyl acrylate and the like, distilling off the organic solvent and water from the extract consisting of said acrylic acid, acetic acid, organic solvent and a small quantity of water, and further separating the acetic acid from the resulting mixture of acrylic acid and acetic acid by distillation. This method can easily separate acrylic acid from water, and acetic acid from water, respectively, but there still is a difficulty in the separation of acetic acid from acrylic acid.

For example, even if trying to separate acrylic acid by a distillation from a mixture of acrylic acid and acetic acid in a ratio of 10:1 by weight, it is difficult to practise the process on an industry scale due to the necessity of using a column having 55 plates under a reflux ratio of 14. In order to carry out the process on an industrial scale, it is necessary to provide an extraction column, a solvent separation column, an acetic acid separation column and a column recovering solvent contained in the raffinate.

Thus, such process is not only very expensive, but also disadvantageous in that polymerizable acrylic acid is frequently passed through distillation columns, which results in the loss of acrylic acid by the formation of polymer thereof, and furthermore, a great amount of a polymerization inhibitor is required.

There has hitherto been proposed an improved process for separating acrylic acid from acetic acid as disclosed in Japanese patent publication No. 11,247/66. The process comprises adding toluene to an aqueous solution containing acrylic acid and acetic acid, removing water therefrom by an azeotropic distillation to obtain a mixture containing acetic acid, acrylic acid and toluene from the column bottom, removing acetic acid and toluene from said mixture to isolate acrylic acid, and recovering toluene from the mixture of acetic acid and toluene by an azeotropic distillation using water.

However the process referred to above has disadvantages in that the construction cost of the equipment is considerably expensive since a number of towers for the reduced pressure distillation are required, and there is required an additional operation for separating toluene from acetic acid due to the fact that a large amount of toluene is recyclingly used. Moreover, the process is disadvantageous in that the loss of acrylic acid due to polymerization thereof is increased since acrylic acid which tends to be easily polymerized is passed through the distillation column twice where the polymerization likely takes place, and that the greater amounts of a polymerization inhibitor are required.

SUMMARY OF THE INVENTION

An object of the present invention is to provide a practical and economical process for separating acrylic acid substantially free from water and acetic acid from an aqueous solution containing acrylic acid and acetic acid on an industrial scale.

The present invention is based on our discovery that acrylic acid substantially free from water and acetic acid may be obtained using only one distillation tower with a surprising easiness by subjecting an aqueous solution containing acrylic acid and acetic acid to an azeotropic distillation in the presence of at least one member selected from the group consisting of butyl acetate, ethyl butyrate, ethylisobutyrate, ethyl methacrylate, propyl acrylate and propyl propionate as an entrainer.

According to the process of the present invention, an aqueous acetic acid solution containing substantially no acrylic acid may be obtained from the column head, and an acrylic acid containing substantially no acetic acid and water may be obtained from the column bottom.

Entrainers which may be used in the present invention include butyl acetate, ethyl butyrate, ethyl isobutyrate, ethyl methacrylate, propyl acrylate, and propyl propionate.

Among the esters used in the present invention, the butyl acetate contains n-, iso-, sec- and tert-butyl groups; and the propyl acrylate and propyl propionate contain n- and iso-propyl groups. In the present invention, sec-butyl acetate and iso-butyl acetate are particularly preferable. They may be used either alone or in admixture thereof. Furthermore, it is also possible in the process of the present invention to use a mixed entrainer consisting of these esters referred to above, either alone or in admixture thereof, and an aliphatic alcohol having 4 to 8 carbon atoms, the amount of said alcohol being more than $\frac{1}{10}$, preferably from $\frac{3}{4}$ to $\frac{1}{6}$, of the amount of esters used.

The preferred and typical examples of alcohol used in the present invention include butanol, amyl alcohol, hexanol, heptanol, octanol, including n-, iso-, sec- and tert-isomers of these; and 2-ethyl hexanol.

Addition of alcohol to esters as an entrainer firstly makes the separation of acetic acid from acrylic acid easier than in the case of using an ester alone as an entrainer, and secondly brings about an effect in a remarkable decrease in the heat energy necessary for removing water. More specifically, when an ester alone is used as an entrainer and if the concentration of acrylic acid is high in the material supplied, since acrylic acid is distilled from the column head, there is a necessity of refluxing a mixture of an entrainer layer of the head distillate and a part of an aqueous layer in order to separate acrylic acid efficiently.

However, by the addition of an alcohol to the esters, the refluxing of the aqueous phase is no longer required. Thus, there are brought about advantages in that the amount of heat required for the distillation is reduced, the operations involved become easy and the equipment may be made simple.

Moreover, while the concentration of water in the azeotropic mixture of esters and water ranges from 15 to 30% by weight, when an ester alone or a mixture of esters is used as an entrainer, the concentration is increased to the range of from 25 to 40% by weight by the addition of an alcohol to the ester entrainer. Thus, there is an advantage in that the amount of heat required for the distillation can be reduced.

The effect of the use of an entrainer or a mixed entrainer (hereinafter referred to simply as "entrainer") shown in the azeotropic distillation in the process of the present invention is that the use of an entrainer facilitates not only the separation of acrylic acid from water, but also the separation of acrylic acid from acetic acid, due to the influence of the entrainer used on the gas-liquid balance between these two components.

In order that the effect of the use of an entrainer be fully demonstrated, it is necessary that the amounts of the entrainer retained in the distillation column and refluxed from the column head be suitable.

The suitable amount of the entrainer to be retained in the distillation column varies depending upon the type of entrainer used, the structure of the column, e.g. a packed column, a perforated plate column, bubble cap column, etc., and the composition of the material aqueous solution containing acrylic acid and acetic acid. More particularly, the amount of the entrainer depends upon the composition of acrylic acid, acetic acid and water, and while the entrainer should be present in the column up to the plate at which acetic acid and water are required to be distilled off, depending upon the composition of acetic acid and water, the amount is to be decided experimentally. For example, in a plate column having 35 mm. diameter and 25 plates, the amount of n-butyl acetate required for separating acrylic acid ranges from 60 to 80 ml. when an aqueous solution containing 30–50 wt. percent of acrylic acid and 3–5 wt. percent of acetic acid is supplied at a rate of 120 g./hr. For further example, when sec-butyl acetate is used in a plate column having 35 mm. diameter and 35 plates, the amount thereof required for separating acrylic acid from the same aqueous solution as referred to above supplied at a rate of 90–120 g./hr. ranges from 30 to 50 ml. For still further example, when n-butyl acetate and n-butanol are used in a plate column having 35 mm. diameter and 25 plates, the amounts thereof required for separating acrylic acid for the same aqueous solution as referred to above supplied at a rate of 120 g./hr. range from 20 to 40 ml., and from 7 to 15 ml., respectively.

When the amount of the entrainer is excessively small and the entrainer is present in the distillation column in only a small amount, the separation of acrylic acid from acetate acid is accomplished only unsatisfactorily, causing acetic acid to appear from the column bottom or acrylic acid to be distilled off from the column head.

Although a small amount of the entrainer may be present at the column bottom, in this case, the separation of the entrainer from acrylic acid becomes necessary. On the other hand, when a large amount of the entrainer is present in the column bottom, acetic acid is mixed with acrylic acid in the column bottom and the separation of acrylic acid from acetic acid becomes quite difficult.

The amount of an alcohol added to the esters as an entrainer used in the present invention is more than one-tenth, and preferably from three-quarter to one-sixth of the weight of the ester used. When the amount of an alcohol is less than one-tenth of the weight of the ester used, the effect of the addition of an alcohol is almost none, while if an alcohol is added to the esters in excessively large amounts, the alcohol appears in the column bottom thereby necessitating the separation of the alcohol from acrylic acid. Alternatively, the alcohol should be esterified in a separate reactor in the presence of an esterification catalyst such as sulfuric acid and p-toluene sulfonate, and removed as an esterified product, or the separation of acrylic acid from the esterified products becomes necessary.

On the other hand, the vapor from the column top is condensed to form two layers, i.e., an aqueous layer and an entrainer layer, of which the former is discharged from the system, while the latter is wholly refluxed.

However, when an ester or a mixture of the esters is used as an entrainer, if the concentration of acrylic acid in the material aqueous solution supplied is high, since acrylic acid is distilled off from the column, in order to separate acrylic acid efficiently, it is necessary that a part of an aqueous layer of the decanter be refluxed. However, in this instance, if the amount of the aqueous layer refluxed is excessively large, since the column bottom effluent tends to contain a part of acetic acid, it is necessary that the amount of the aqueous layer to be refluxed be suitably adjusted.

When using the entrainers other than those defined hereinbefore, for example, ethyl acetate and ethyl acrylate acrylic acid is insufficiently separated from acetic acid with result in the presence of acetic acid in the column bottom effluent, and the object of the present invention may not be accomplished. Similarly, when ketones such as methyl isobutyl ketone and methyl n-butyl ketone are used, the distillation of acetic acid to the column head is difficult with resultant presence of acetic acid in the column bottom effluent and the separation of acrylic acid from acetic acid is accomplished only unsatisfactorily.

When using high boiling esters such as butyl acrylate, butyl propionate, amyl acetate and the like as an entrainer, the distillation of acrylic acid to the column head leads to an increase in the loss of acrylic acid in the column head. Similarly, when n-octane and monochlorobenzene are used an entrainer, acrylic acid is distilled off at the column head with the consequent result in the increase in the loss of acrylic acid in the column head.

From the foregoing, the superiority of the entrainers defined hereinbefore will be clearly understood. By the use of the entrainer according to the present invention, since the unstable and easily polymerizable acrylic acid can be separated in a single distilling column, an economical isolation and recovery of acrylic acid can be achieved advantageously on an industrial scale with the use of a small amount of a polymerization inhibitor and using inexpensive equipment.

In accordance with the process of the present invention, a material solution containing acrylic acid and acetic acid is subjected to an azeotropic distillaation using the entrainer defined herein to distill a mixed vapor consisting of the entrainer, water and acetic acid from the column head and to separate acrylic acid substantially free from water and acetic acid from the column bottom. The mixed vapor of the entrainer, water and acetic acid from the column head is then cooled to be seperated into two layers and an aqueous solution of acetic acid is withdrawn as an aqueous layer.

The material solutions to which the process of the present invention is applicable include an aqueous solution containing mainly acrylic acid and acetic acid prepared by cooling to condense a gaseous mixture obtained in the oxidation of propylene and acrolein and stabilized by the addition of a polymerization inhibitor such as hydroquinone and phenothiazine; an aqueous solution prepared as above but acrolein is removed therefrom, and, of course, aqueous solutions containing acrylic acid and acetic acid which are prepared by processes other than referred to above.

Aqueous solution of the acetic acid separated from acrylic acid may be thrown away, but acetic acid may be recovered therefrom as an acetic acid ester by esterifying the same with an alcohol such as methanol, ethanol and butanol in the presence of an esterifying catalyst such as sulfuric acid, p-toluene sulfonic acid, and an ion exchange resin. Also, it may be possible to recover acetic acid therefrom by the azeotropic dehydration using an entrainer such as ethyl acetate, isoamyl acetate, and butyl acetate. The present invention will be explained more in detail in conjunction with the accompanying drawings.

In the drawing, FIG. 1 shows one embodiment of the present invention and FIG. 2 shows another embodiment thereof. Referring to FIG. 1, an aqueous solution 1 containing acrylic acid and acetic acid which is stabilized by the addition of a known polymerization inhibitor such as hydroquinone, hydroquinone monomethyl ether, phenothiazine, phenols, methylene blue and oxygen is fed in a liquid or a vapor form to an azeotropic distilling column 2. For example, butyl acetate is used as an entrainer. The distilling column 2 is operated under a reducing pressure of from 30 to 300 mm. Hg-abs. A column head vapor consisting of water, acetic acid and butyl acetate is then condensed by a condenser 4 and thereafter separated into two layers of an entrainer layer and an aqueous layer in a decanter 5. The whole portion of said entrainer layer is refluxed from a pipe 6 to the column 2. From a pipe 8, is supplied a solution of a polymerization inhibitor. Further, if necessary, a part of the aqueous layer is refluxed from a pipe 7 for the purpose of preventing the distillation of acrylic acid from the column head. The remainder of the aqueous layer is withdrawn from a pipe 10. The aqueous layer thus withdrawn is an aqueous solution of acetic acid containing about 1 wt. percent of butyl acetate which is the solubility limit.

On the other hand, from the bottom of the column, acrylic acid substantially free from water and acetic acid can be obtained through a pipe 9. A part of the acrylic acid may be heated by a reboiler 3 and may be returned to the column 2. By redistilling the resulting acrylic acid, there can be obtained a more highly purified acrylic acid. In order to recover acetic acid from the aqueous solution withdrawn from the column head, the aqueous solution of acetic acid obtained from a pipe 10 is fed to an azeotropic distilling column 11 together with a member selected from butyl acetate inclusive of n-, iso-, sec-, and tert-isomers, ethyl acetate and isoamyl acetate as an entrainer, as shown in FIG. 2. The column 11 is operated under a pressure of from 60 mm. Hg-abs. to atmospheric pressure. The amount of the entrainer in the column is adjusted in such a manner that the amount is small below the plate at which the material solution is supplied. A mixed vapor of water and butyl acetate withdrawn from the column head is condensed by means of a condenser 12, and separated into two layers of an entrainer layer and an aqueous layer by a decanter 13. The whole portion of said entrainer layer is refluxed from a pipe 14, and if acetic acid is distilled off from the column head, a part of the aqueous layer is refluxed from a pipe 15. A polymerization inhibitor, if necessary, is added to said refluxing solution. The remainder of the aqueous layer is discharged from the system via a pipe 16.

From the column bottom through a pipe 18, acetic acid containing a little amount of acrylic acid is obtained, and a part of the acetic acid may be heated by a reboiler 17 and may be returned to the column 11. If necessary, the acetic acid discharged from a pipe 18 may be purified to give a highly purified acetic acid. Water discharged from the pipe 16 contains the entrainer at the solubility limit, and the entrainer dissolved therein may be recovered by blowing steam into said water.

The following examples will serve to illustrate the present invention more fully. However, the present invention shall not be restricted by these examples. In the examples, "wt. percent" referred to means "percent by weight."

EXAMPLE 1

Experiment was carried out using 60 g. of n-butyl acetate as an entrainer in a column having 35 mm. diameter and 25 plates. Aqueous solution containing 50 wt. percent of acrylic acid and 5 wt. percent of acetic acid together with phenothiazine and hydroquinone as the polymerization inhibitor was continuously supplied to the 15th plate from the column head at a rate of 120 g./hr. The plate column was operated at a pressure of 60 mm. Hg (absolute pressure), column head temperature of 44.1° C. and column bottom temperature of 89° C., and whole quantity of the entrainer layer in the decanter at the column head and 30 g./hr. of aqueous solution were refluxed.

A residual aqueous layer remaining in the decanter at the column head, which contained 9.3 wt. percent of acetic acid, a trace amount of acrylic acid and 0.56 wt. percent of n-butyl acetate, was then discharged at a rate of 60.2 g./hr. while adding a polymerization inhibitor.

On the other hand, acrylic acid containing 0.06 wt. percent of water, 0.05 wt. percent of acetic acid, and 0.10 wt. percent of n-butyl acetate was continuously obtained from the column bottom at a rate of 59.9 g./hr.

In this experiment, hold up amount in the column was determined as 101 ml.

Furthermore, said experiment was repeated except that a reflux amount of aqueous layer from the decanter was changed to 60 g./hr. As the result, aqueous layer, containing a trace amount of acrylic acid and 9.0 wt. percent of acetic acid, was discharged from the column head at a rate of 59.4 g./hr.

On the other hand, acrylic acid containing 0.45 wt. percent of water, and 1.15 wt. percent of acetic acid was continuously obtained from the column bottom at a rate of 60.8 g./hr.

500 p.p.m. of hydroquinone was added to the aqueous acetic acid solution containing 9.9 wt. percent of acetic acid and a trace amount of acrylic acid which was obtained from the column head, and continuously charged at a rate of 100 g./hr. to the 20th plate from the column head having 35 mm. diameter and 40 plates using 40 g. of n-butyl acetate as entrainer.

The plate column was operated at 200 mm. Hg (absolute pressure), column head temperature of 43° C., and column bottom temperature of 81° C., and only the whole quantity of entrainer layer in the decanter was refluxed and the remaining aqueous layer was discharged at a rate of 90.2 g./hr. The aqueous layer separated from the column head contained 0.1 wt. percent of acetic acid. On the other hand, acetic acid containing 0.15 wt. percent of water, and 0.9 wt. percent of acrylic acid was continuously obtained from the column bottom at a rate of 9.85 g./hr.

EXAMPLE 2

Experiment was carried out using 78 g. of isobutyl acetate as an entrainer in the same plate column as used in Example 1. The same aqueous solution as used in Example 1 was continuously fed to the 15th plate from the column head at a rate of 60 g./hr.

The plate column was operated at a pressure of 60 mm. Hg (absolute pressure), column head temperature of 42.8° C. and column bottom temperature of 89.8° C., and only the entrainer layer in the decanter at the column head was refluxed. The aqueous layer in the decanter was separated at a total quantity of 30.2 g./hr. while adding a polymerization inhibitor.

The aqueous solution consisted of 9.9 wt. percent of acetic acid, 0.48 wt. percent of iso-butyl acetate and the balance of water, and existence of acrylic acid was not confirmed. On the other hand, acrylic acid containing 0.11 wt. percent of water, 0.05 wt. percent of iso-butyl acetate and a trace amount of acetic acid was continuously obtained from the column bottom at a rate of 30.0 g./hr.

EXAMPLE 3

Experiment was carried out using 60 g. of n-butyl acetate as an entrainer in the same plate column as used in Example 1. Aqueous solution containing 30 wt. percent of acrylic acid and 3 wt. percent of acetic acid was continuously supplied at a rate of 120 g./hr. together with a polymerization inhibitor to the 15th plate from the column head.

The plate column was operated at a pressure of 60 mm. Hg (absolute pressure), column head temperature of 42.0° C. and column bottom temperature of 90.0° C., and only the entrainer layer in the decanter at the column head was refluxed. Aqueous solution in the decanter was separated at a rate of 84.5 g./hr. The aqueous solution contained 4.4 wt. percent of acetic acid and a trace quantity of acrylic acid. On the other hand, acrylic acid containing 0.10 wt. percent of water and 0.15 wt. percent of acetic acid was continuously obtained from the column bottom at a rate of 35.8 g./hr.

Further, the same experiment was carried out with exception that the amount of n-butyl acetate used was changed to 36 g. As the result, aqueous solution containing 4.25 wt. percent of acetic acid and 0.46 wt. percent of acrylic acid was continuously obtained from the column head at a rate of 85.1 g./hr.

On the other hand, acrylic acid containing 0.11 wt. percent of water and only a trace amount of acetic acid was continuously obtained from the column bottom at a rate of 35.4 g./hr.

Further, the same experiment was repeated with exception that 18 g. of n-butyl acetic acid was used.

As the result, aqueous solution containing 3.0 wt. percent of acrylic acid and 3.9 wt. percent of acetic acid was continuously obtained from the column head at a rate of 87.0 g./hr. On the other hand, acrylic acid containing 0.14 wt. percent of acetic acid and 0.14 wt. percent of water was continuously obtained from the column bottom at a rate of 33.4 g./hr.

EXAMPLE 4

Experiment was carried out using 45 g. of sec-butyl acetate as an entrainer in a plate column having 35 mm. diameter and 35 plates. Aqueous solution containing 40 wt. percent of acrylic acid and 4 wt. percent of acetic acid together with phenothiazine and hydroquinone as polymerization inhibitor was fed at a rate of 120 ml./hr. to the 15th plate from the column head.

The plate column was operated at a pressure of 70 mm. Hg (absolute pressure), column head temperature of 41° C. and column bottom temperature of 91° C., and whole amount of the entrainer in the decanter at the column head was refluxed. Aqueous solution in the decanter at the column head was discharged at a rate of 72.2 g./hr. while adding a polymerization inhibitor. Said aqueous solution contained 6.6 wt. percent of acetic acid, 0.2 wt. percent of acrylic acid and 0.9 wt. percent of sec-butyl acetate.

On the other hand, acrylic acid containing 0.15 wt. percent of water and a trace amount of acetic acid was obtained from the column bottom at a rate of 47 g./hr.

EXAMPLE 5

Experiment was carried out using 53 g. of n-butyl acetate as an entrainer in the same plate column as used in Example 1. Aqueous solution containing 10 wt. percent of acrylic acid and 1 wt. percent of acetic acid together with a polymerization inhibitor was fed continuously to the 15th plate from the column head at a rate of 120 g./hr.

The plate column was operated at a pressure of 60 mm. Hg (absolute pressure), column head temperature of 44.7° C. and column bottom temperature of 89.7° C., and whole quantity of the entrainer layer in the decanter at the column head was refluxed and the whole quantity of aqueous layer was discharged at a rate of 108.6 g./hr.

Said aqueous solution contained 1.07 wt. percent of acetic acid, but no acrylic acid. On the other hand, acrylic acid containing 0.4 wt. percent of acetic acid and 0.17 wt. percent of water was obtained from the column bottom at a rate of 12.0 g./hr.

EXAMPLE 6

Experiment was carried out using 70 g. of ethyl butyrate as an enterainer in the same plate column as used in Example 1, and the same aqueous solution as used in Example 1 was fed continuously to the 15th plate from the column head at a rate of 90 g./hr. Said plate column was operated at a pressure of 60 mm. Hg (absolute pressure), column head temperature of 49.5° C. and column bottom temperature of 87.8° C., and only the whole quantity of entrainer layer in the decanter at the column head was refluxed and the aqueous solution was discharged at a total quantity of 45.2 g./hr. while adding a polymerization inhibitor.

Said aqueous solution contained 9.9 wt. percent of acetic acid, 0.62 wt. percent of ethyl butyrate and a trace quantity of acrylic acid.

On the other hand, acrylic acid containing 0.05 wt. percent of water and 0.1 wt. percent of ethyl butyrate was continuously obtained from the column bottom at a rate of 44.9 g./hr., and a trace quantity of acetic acid was contained.

EXAMPLE 7

Experiment was carried out using 55 g. of n-propyl propionate as an entrainer in the same plate column as used in Example 1. The same aqueous solution as in Example 1 was continuously fed to the 15th plate from the column head at a rate of 90 g./hr.

The plate column was operated at a pressure of 60 mm. Hg (absolute pressure), column head temperature of 44.3° C. and column bottom temperature of 87.0° C., and only the whole quantity of entrainer in the decanter at the column head was refluxed, and the aqueous layer was continuously discharged at a total quantity of 45.3 g./hr. while adding a polymerization inhibitor. Said aqueous solution contained 9.9 wt. percent of acetic acid, 0.2 wt. percent of acrylic acid and 0.7 wt. percent of n-propyl propionate.

On the other hand, acrylic acid containing 0.03 wt. percent of water and 0.1 wt. percent of acetic acid was obtained from the column bottom at a rate of 45.0 g./hr.

Further, the same experiment was repeated with exception that the amount of n-propyl propionate used was changed to 80 g. As the result, aqueous solution discharged from the column head contained 5.8 wt. percent of acetic acid, and no acrylic acid.

On the other hand, acrylic acid containing 0.10 wt. percnet of wter and 4.1 wt. percent of acetic acid was continuously obtained from the column bottom.

Further, the same experiment was repeated with exception that the amount of n-propyl propionate used was changed to 30 g. As the result, aqueous solution discharged from the column head contained 9.9 wt. percent of acetic acid and 7.7 wt. percent of acrylic acid. On the other hand, acrylic acid discharged from the column bottom contained 0.1 wt. percent of water and no acetic acid. Furthermore, experiment was carried out under such conditions that 69 g. of ethyl acrylate as an entrainer were maintained in the column under a pressure of 150 mm. Hg in the same column as used in the preceding experiments.

As the result, aqueous solution discharged from the column head contained a trace quantity of acetic acid and acrylic acid, and solution discharged from the column bottom was acrylic acid containing 9.1 wt. percent of acetic acid.

And, further experiment was carried out using 64 g. of n-butyl acrylate as an entrainer at 60 mm. Hg in the same column. As the result, more than 15 wt. percent of acrylic acid was distilled off from the column head, and it was difficult to separate aqueous layer from entrainer layer in the decanter.

EXAMPLE 8

Experiment was carried out using 75 g. of ethyl methacrylate as an entrainer in the same plate column as used in Example 1. The same aqueous solution as in Example 1 was fed continuously to the 15th plate from the column head at a rate of 90 g./hr. Said plate column was operated at a pressure of 60 mm. Hg (absolute pressure), column head temperature of 47.3 ° C. and column bottom temperature of 87.7° C., and only the whole quantity of entrainer layer in the decanter at the column head was refluxed and aqueous layer was continuously discharged at a total quantity of 45.5 g./hr. while adding a polymerization inhibitor. Said aqueous solution contained 9.9 wt. percent of acetic acid and a trace quantity of acrylic acid. On the other hand, acrylic acid containing 0.01 wt. percent of water and trace quantity of acetic acid was continuously obtained from the column bottom at a rate of 44.9 g./hr.

Further, the same experiment was repeated with exception that 40 g. of ethyl methacrylate was used. As the result, aqueous solution discharged from the column head contained 9.9 wt. percent of acetic acid and 5.2 wt. percent of acrylic acid. On the other hand, acrylic acid discharged from the column bottom contained 0.05 wt. percent of water and a trace quantity of acetic acid.

Further, the same experiment was carried out with exception that 95 g. of ethyl methacrylate was used. As the result, aqueous solution discharged from the column head contained 7.8 wt. percent of acetic acid and 3.7 wt. percent of acrylic acid. On the other hand, acrylic acid discharged from the column bottom contained 0.03 wt. percent of water and 2.1 wt. percent of acetic acid.

EXAMPLE 9

Experiment was carried out using 35 g. of n-butyl acetate and 8 g. of n-butanol as entrainers in a plate column having 35 mm. diameter and 25 plates. Aqueous solution containing 50 wt. percent of acrylic acid and 5 wt. percent of acetic acid together with phenothiazine and hydroquinone as polymerization inhibitor was continuously fed to the 15th plate from the column head at a rate of 120 g./hr. Said plate column was operated at a pressure 60 mm. Hg (absolute pressure), column head temperature of 49.0° C. and column bottom temperature of 87.1° C., and only whole quantity of entrainer layer in the decanter at the column head was refluxed, and aqueous layer was discharged at a total quantity of 63.9 g./hr. while adding a polymerization inhibitor.

Said aqueous solution contained 9.9 wt. percent of acetic acid, 0.62 wt. percent of n-butyl acetate, 6.1 wt. percent of n-butanol and a trace quantity of acrylic acid.

On the other hand, acrylic acid having purity of more than 98% was obtained from the column bottom at a rate of 60.0 g./hr.

EXAMPLE 10

Experiment was carried out using 35 g. of n-butyl acetate and 6.5 g. of 2-ethyl hexyl alcohol as entrainer in the same plate column as used in Example 1. The same aqueous solution as in Example 1 was continuously fed to the 15th plate from the column head at a rate of 120 g./hr.

Said plate column was conducted at 60 mm. Hg (absolute pressure), column head temperature of 49.7° C. and column bottom temperature of 87.2° C., and only the whole quantity of entrainer layer in the decanter at the column head was refluxed and aqueous layer was taken out at a total quantity of 60.3 g./hr.

Said aqueous solution contained 9.7 wt. percent of acetic acid, 0.62 wt. percent of n-butyl acetate and 0.13 wt. percent of 2-ethyl hexyl alcohol, but little acrylic acid. On the other hand, acrylic acid of more than 98% was obtained from the column bottom at a rate of 59.9 g./hr.

EXAMPLE 11

Experiment was carried out using 50 g. of isobutyl acetate and 10 g. of iso-butane as entrainers in the same plate column as in Example 1. The same aqueous solution as in Example 1 was continuously fed to the 15th plate from the column head at a rate of 60 g./hr.

Said plate column was operated at a pressure of 60 mm. Hg (absolute pressure), column head temperature of 44.5° C. and column bottom temperature of 87.0° C., and only the entrainer layer in the decanter at the column head was refluxed, and aqueous layer was discharged at a total quantity of 32.6 g./hr.

Said aqueous solution contained 9.9 wt. percent of acetic acid and a trace quantity of acrylic acid. On the other hand, acrylic acid having purity of more than 98% was obtained from the column bottom at a rate of 30.0 g./hr. at a rate of 30.0 g./hr.

EXAMPLE 12

Experiment was carried out using 60 g. of ethyl butyrate and 15 g. of iso-amyl alcohol as entrainers in the same plate column as in Example 1. The same aqueous solution as in Example 1 was fed to the 15th plate from the column head at a rate of 90 g./hr.

Said plate column was operated at a pressure of 60 mm. Hg (absolute pressure), column head temperature of 50.3° C., and column bottom temperature of 86.9° C., and only the entrainer layer in the decanter at the column head was refluxed, and the aqueous solution was discharged at a total quantity of 46.1 g./hr.

Said aqueous solution contained 9.8 wt. percent of acetic acid and a trace quantity of acrylic acid. On the other hand, acrylic acid having purity of more than 98% was continuously obtained from the column bottom.

EXAMPLE 13

Experiment was carried out using 40 g. of propyl acrylate and 10 g. of butanol as entrainers in the same plate column as in Example 1. The same aqueous solution as in Example 1 was continuously fed to the 15th plate from the column head at a rate of 90 g./hr.

Said plate column was operated at a pressure of 60 mm. Hg (absolute pressure), column head temperature of 44.1° C. and column bottom temperature of 86.9° C., and only the entrainer layer in the decanter at the column head was refluxed and the aqueous layer was continuously discharged at a total quantity of 48.1 g./hr. Said aqueous solution contained 9.9 wt. percent of acetic acid and a trace quantity of acrylic acid.

On the other hand, acrylic acid having purity of more than 98% was obtained from the column bottom at a rate of 44.9 g./hr.

We claim:

1. In the process for separating acrylic acid from an aqueous solution containing acrylic acid and acetic acid, the improvement which comprises subjecting the said aqueous solution to an azeotropic distillation in the presence of at least one member selected from the group consisting of butyl acetate, ethyl butyrate, ethyl isobutyrate, ethyl methacrylate, propyl acrylate, and propyl propionate as an entrainer, distilling off acetic acid and water from the column head and separating acrylic acid from the column bottom.

2. In the process for separating acrylic acid from an aqueous solution containing acrylic acid and acetic acid, the improvement which comprises subjecting the aqueous solution containing acrylic acid and acetic acid to an azeotropic distillation in the presence of a mixed entrainer consisting of at least one member selected from the group consisting of butyl acetate, ethyl butyrate, ethyl isobutyrate, ethyl methacrylate, propyl acrylate and proply propionate, and an aliphatic alcohol having 4 to 8 carbon atoms, the weight of the said alcohol being more than 1/10 based on the weight of said esters, distilling off acetic acid and water from the column head and separating acrylic acid from the column bottom.

3. Process according to claim 1 wherein the aqueous acetic acid solution obtained from said column head is then subjected to further azeotropic distillation in the presence of a member selected from the group consisting of a butyl acetate, ethyl acetate and isoamyl acetate to obtain acetic acid from the column bottom.

4. Process according to claim 1 wherein said member is sec-butyl acetate or iso-butyl acetate.

5. Process according to claim 2 wherein the aqueous acetic acid solution obtained from said column head is subjected to further azeotropic distillation in the presence of a member selected from the group consisting of a butyl acetate, ethyl acetate and isoamyl acetate to obtain acetic acid from the column bottom.

6. Process according to claim 2 wherein the mixed entrainer is at least one member selected from the group consisting of sec-butyl acetate and iso-butyl acetate, and an aliphatic alcohol having from 4 to 8 carbon atoms.

7. Process according to claim 4 wherein the aqueous acetic acid solution obtained from said column head is subjected to further azeotropic distillation in the presence of a member selected from the group consisting of a butyl acetate, ethyl acetate and isoamyl acetate to obtain acetic acid from the column bottom.

8. Process according to claim 6 wherein the aqueous acetic acid solution obtained from said column head is subjected to further azeotropic distillation in the presence of a member selected from the group consisting of a butyl acetate, ethyl acetate and isoamyl acetate to obtain acetic acid from the column bottom.

References Cited
UNITED STATES PATENTS

| | | | |
|---|---|---|---|
| 1,915,002 | 6/1933 | Ricard et al. | 203—15 |
| 2,176,500 | 10/1939 | Hyatt | 203—15 |
| 3,392,091 | 7/1968 | Hohenschutz | 203—60 |
| 3,344,178 | 9/1967 | Brown et al. | 203—15 |
| 3,432,401 | 3/1969 | Tcherkawsky | 203—15 |
| 3,433,831 | 3/1969 | Yomiyama et al. | 203—15 |
| 3,527,677 | 9/1970 | Harping | 203—15 |

WILBUR L. BASCOMB, JR., Primary Examiner

U.S. Cl. X.R.

203—15, 60, 63, 16, DIG 21, 81; 260—526 N